United States Patent

Kohtake

[11] Patent Number: 5,540,328
[45] Date of Patent: Jul. 30, 1996

[54] CONTAINING CASE FOR CONTAINING A DISK-LIKE RECORDING MEDIUM

[75] Inventor: Yasushi Kohtake, Sagamihara, Japan

[73] Assignee: Ricoh Co., Ltd., Tokyo, Japan

[21] Appl. No.: 234,937

[22] Filed: Apr. 28, 1994

[30] Foreign Application Priority Data

Jun. 11, 1993 [JP] Japan .................... 5-166262

[51] Int. Cl.$^6$ .................................................. B65D 85/30
[52] U.S. Cl. .................................... 206/308.1; 206/308.3; 206/493
[58] Field of Search ...................... 206/309–313, 206/308.1, 308.2, 308.3, 387.1, 387.12, 387.15; 360/133

[56] References Cited

U.S. PATENT DOCUMENTS

| | | | |
|---|---|---|---|
| 4,159,827 | 7/1979 | Torrington | 206/444 X |
| 4,266,784 | 5/1981 | Torrington | 206/312 X |
| 4,413,732 | 11/1983 | Louzil | 206/387 |
| 4,463,849 | 8/1984 | Prusak et al. | 206/309 X |
| 4,463,850 | 8/1984 | Gorog | 206/309 |
| 4,815,598 | 3/1989 | Richter | 206/387 |
| 4,815,795 | 3/1989 | Accumenno et al. | 206/387 X |
| 4,838,422 | 6/1989 | Gregerson | 206/444 |
| 5,080,231 | 1/1992 | Price, Jr. et al. | 206/387 |
| 5,121,380 | 6/1992 | Fujita et al. | 360/133 X |
| 5,196,978 | 3/1993 | Washo et al. | 360/133 |
| 5,385,235 | 1/1995 | Ikebe et al. | 206/308.1 |

*Primary Examiner*—Bryon P. Gehman
*Attorney, Agent, or Firm*—Cooper & Dunham LLP

[57] ABSTRACT

A slide-type containing case for containing a disk cartridge, compresses: a pair of case pieces joined with each other at respective free end edges thereof, each of said case piece being U-shaped; an opening portion disposed on one side portion of the case pieces, through which the cartridge is changed or discharged; a lever formed by notching of one side plate of one of the case pieces perpendicular to the opening portion. deformable resiliently inwardly or outwardly with respect to the containing case; an engage portion disposed on the lever for engaging with a slot portion, the slot portion being disposed on a side end face of the cartridge to be contained in the containing case; and a knob disposed on the lever and operational from the outside of the containing case.

6 Claims, 7 Drawing Sheets

CONTAINING CASE FOR CONTAINING A DISK-LIKE RECORDING MEDIUM

BACKGROUND OF THE INVENTION

1. Field of the Invention

The present invention relates to a containing case for containing a cartridge which holds a disk-like recording medium such as a magneto-optical disk, or an optical disk and the like.

2. Description of the Related Art

A disk-like recording medium such as a magneto-optical disk, or an optical disk and the like is held rotatably in a cartridge. The cartridge prevents dusts from fitting with the recording medium, and prevents the recording medium from being mechanically damaged, thereby to prevent an occurrence of erroneous operation of the device and a disappearance of data on recording or reproducing.

If the cartridge itself is left to be exposed to the open air, the dusts are fitted with an outer face of the cartridge. In a case where the cartridge fitted with the dusts is charged in the recording and reproducing device, the dusts are fitted with an optical system of a driving unit or the recording medium and the like, on recording or reproducing. That brings an reading error. Accordingly, the cartridge is kept in such a condition as to be contained in a containing case. And, the containing case is useful to protect the cartridge from a shock and the like on carrying the cartridge.

A conventional containing case is ordinarily of such a type as to be opened like a book in which two case pieces are connected with each other by hinges. In a case where the above mentioned type containing case is charged or discharged with the cartridge, the containing case itself must be took by the hand thereby to be opened or closed. Therefore, for example, in a case where the cartridge contained in the specific containing case is took out from or contained in a box containing many cases, the containing case itself must be took out from the box and opened, and then the cartridge must be charged to or disengaged from the containing case. It brings complicated operation.

In these days, the containing case of slide-in type, that is, not such a type as to be opened like a book, as shown in FIG. 7, is used usually. The containing case 1 of slide-in type has an opening 2 at one end face. An inner wall in one side face of the containing case 1, which one side face is perpendicular to the opening 2, is supported with a lever 3 slidably in directions of arrow A, B. When the lever 3 is positioned at a rear side end of the one side face of the containing case 1 as shown in FIG. 7 and the cartridge (not illustrated) is inserted through the opening 2, a protrusion portion of the lever 3 engages with an recess which is disposed on a shoulder portions of the cartridge, thereby the cartridge can be held within the containing case at a predetermined force. On the other hand, the lever 3 is slid in the direction of the arrow A, so that the cartridge is taken out of the opening 2.

However, the above-mentioned slide-in type containing case is constituted by three parts composed of a front case, a rear case and a lever, and these three components are connected among each other by screws and the like. Many parts are needed, and an assembling man-hour and cost are minimized respectively.

It is therefore an object of the present invention to provide a containing case for containing a cartridge which holds a disk-like recording medium such as a magneto-optical disk, or an optical disk and the like, in which many parts are not needed, and an assembling man-hour and cost are minimized.

The object of the invention can be achieved by a slide-type containing case for containing a disk cartridge, comprising:

a pair of case pieces joined with each other at respective free end edges thereof, each of the case pieces being U-shaped;

an opening portion disposed on one side portion of a pair of the case pieces, through which the cartridge is changed or discharged;

a lever formed by notching of one side plate of one of the case pieces perpendicular to the opening portion, and deformable resiliently inwardly or outwardly with respect to the containing case;

an engage portion disposed on the lever for engaging with a slot portion, the slot portion being disposed on a side end face of the cartridge to be contained in the containing case; and a knob disposed on the lever and operational from the outside of the containing case.

In the containing case of the present invention, the containing case is of a slide-in type in which a pair of case pieces joined with each other at respective free end edges thereof, a lever is formed by notching one side plate of one of the case pieces, an engage portion is disposed on the lever for engaging with a slot portion, and a knob is disposed on the lever and operational from the outside of the case. Accordingly, there can be provided a containing case for containing a cartridge which holds a disk-like recording medium such as a magneto-optical disk, or an optical disk and the like, in which many parts are not needed, and an assembling man-hour and cost are minimized.

Further object and advantages of the present invention will be apparent from the following description of the preferred embodiments of the invention as illustrated in the accompanying drawings.

BRIEF DESCRIPTION OF THE DRAWINGS

FIG. 1c is an enlarged view of a main part of the containing case of FIG. 1a;

FIG. 2b is a perspective view of the containing case of FIG. 2a;

DESCRIPTION OF THE PREFERRED EMBODIMENTS

Embodiments of the present invention will be described in detail hereinafter by referring to the accompanied drawings.

Figure 1A:
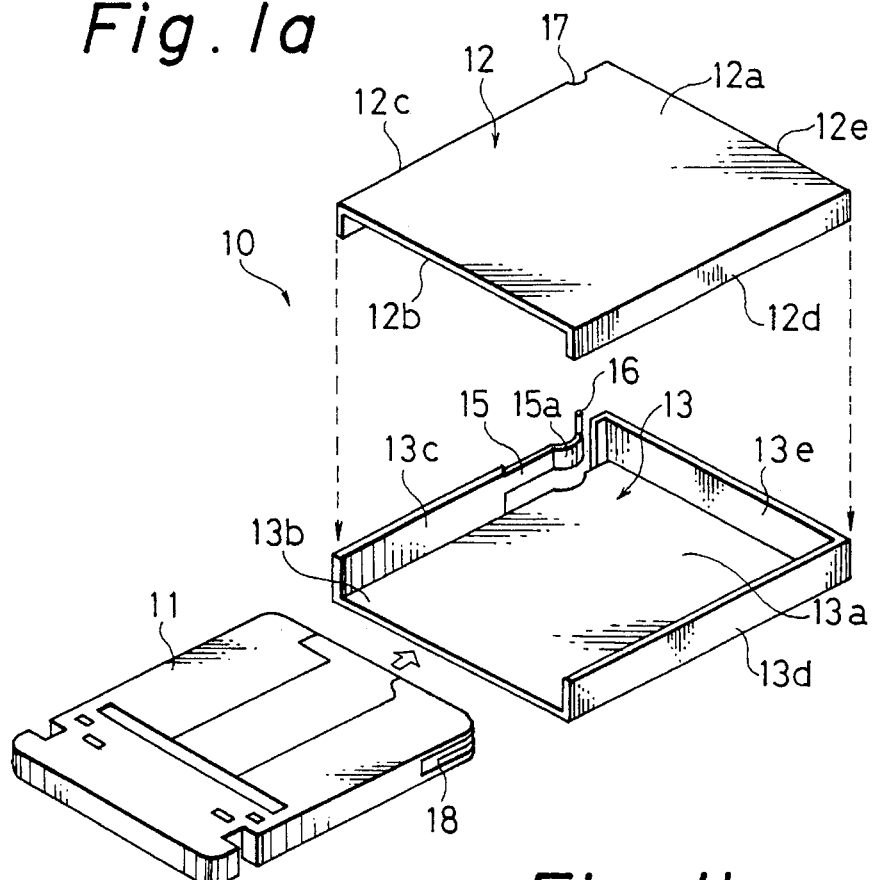
FIG. 1a is an exploded perspective view of a first embodiment of the containing case according to the present invention.

At first, a construction of a first embodiment of the containing case according to the present invention will be explained in detail by referring to FIGS. 1a to 1c.

A containing case 10 contains a cartridge (an article to be contained) 11 in such a manner that the cartridge 11 is inserted thereto or pulled out therefrom. The cartridge 11 contains a disk-like recording medium such as an magnet-optical disk or optical disk and the like. The containing case 10 comprises an upper case piece 12 and a lower case piece 13 joined with each other at respective free end edges thereof, each of the upper case piece 12 and the lower case piece 13 is made of resin and are U-shaped in a front view. The case pieces 12, 13 have top plates 12a and 13a respectively, and have openings 12b, 13b at side plates of respective front end edge of the case pieces 12, 13.

Other three side edges of the upper case piece 12 has side plates 12c, 12d, 12e, and the other three side edges of the lower case piece 13 has side plates 13c, 13d, 13e. Lower free end portions of the side plates 12c, 12d, 12e and upper free end portions of the side plates 13c, 13d, 13e are joined with each other. Respective openings 12b, 13b defines an opening through which the cartridge 11 is charged or discharged.

The side plate 13c of the lower case piece 13 is provided with a tongue-like lever 15 at a rear portion thereof. The lever 15 is formed by notching the side plate 13c. A portion of the lever 15 is bent inwardly to form an engage portion 15a. The engage portion 15a protrudes within a movement path region through which the cartridge 11 moves, and is dimensioned so as to deform resiliently by a press force due to the cartridge when the cartridge is inserted in to the containing case 10. A leading end portion of the engaging portion 15a is formed unitedly with a knob 16 extending upwardly. The knob 18 is of a shaft-like protrusion. A side portion of the upper case piece 12 is provided with a notch 17 at a position corresponding to the knob 16. The knob 16 passes through the notch 17 upwardly. The lever 15 is formed by notching a portion of the side plate 18c and by bending a portion off the lever 15 as shown in FIG 1a.

On the other hand, a slot portion 18 as a recess is disposed on an end portion of a side wall of the cartridge 11.

Figure 1B:
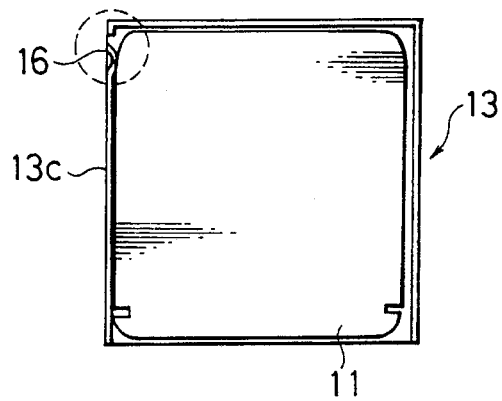
FIG. 1b is a plan view of the containing case of FIG. 1a in which an upper case is removed.
Figure 1C:
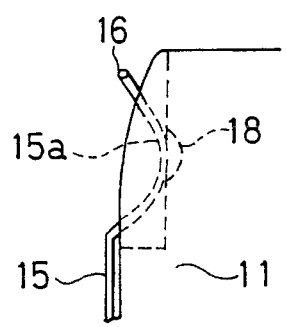

In FIG. 1b and FIG. 1c, when an assembled containing case 10 is inserted with the cartridge 11, the slot portion 18 of the cartridge 11 is engaged resiliently with the engaging portion 15a. Accordingly, the cartridge 11 is held within the containing case 10.

The cartridge 11 is held with the containing case 10 due to an engaging force. When the cartridge 11 is taken out of the containing case 10, the knob 18 is pulled outwardly by a finger thereby to disengage the engaging portion 15a from the slot portion 18.

The first embodiment brings the containing case 10 of a simple construction constituted by two of the upper case piece 12 and the lower case piece 13. Therefore, the containing case 10 is useful in that the assembling man-hour and the cost are minimized respectively, and further the containing case 10 is convenient in usage, because the cartridge 11 can be contained within or taken out of the containing case 10 by an easy one operation.

Further, the slot portions 18 are disposed on both side end portion of the cartridge 11. Accordingly, even if the cartridge 11 is contained in the containing case 10 the right side out or the rear side out, the engage portion 15a realizes a hold of the cartridge 11 in the containing case 10 or a release of the cartridge 11 from the containing case 10.

A construction of a second embodiment of the containing case according to the present invention will be explained in detail by referring to FIG. 2a and FIG. 2b.

Figure 2A:
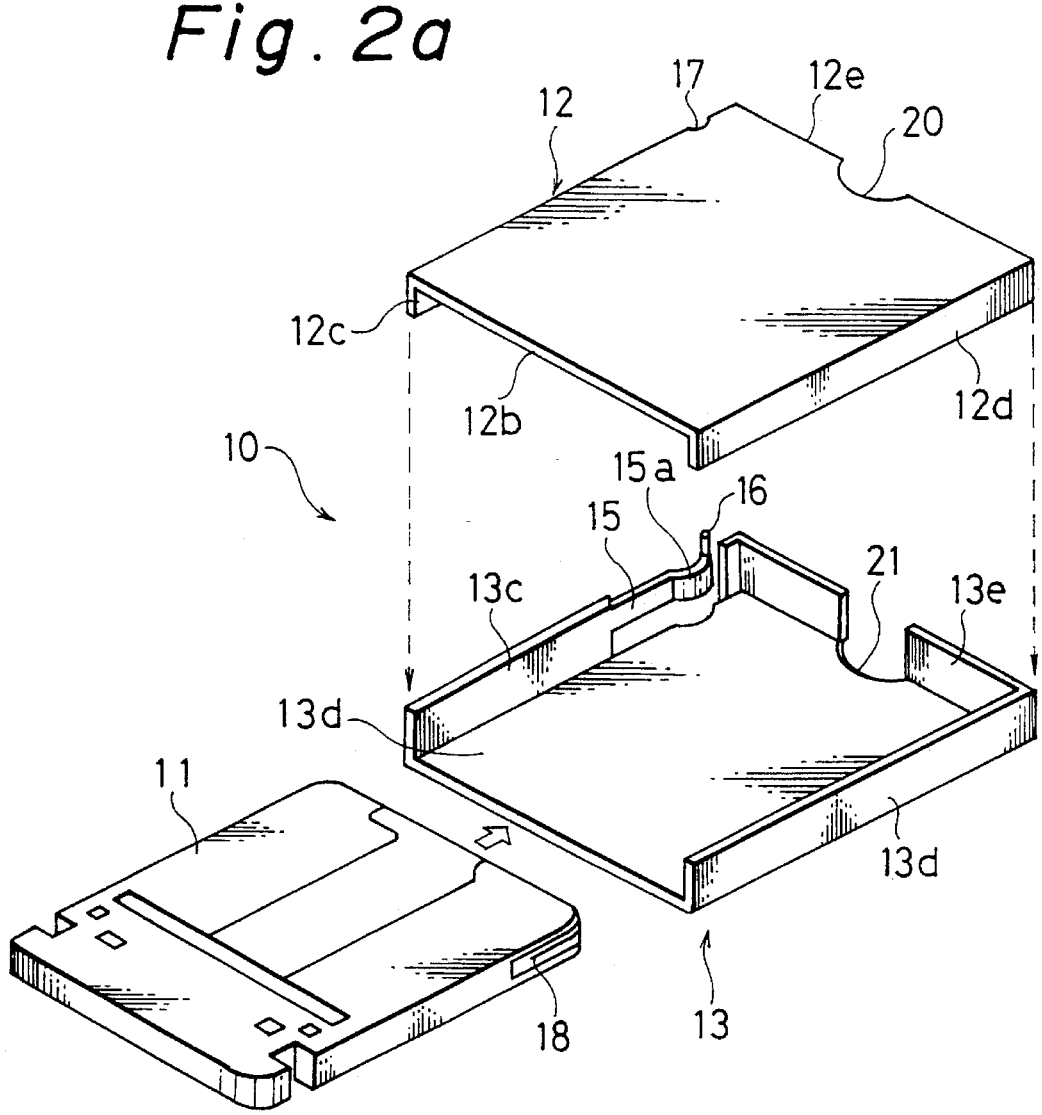
FIG. 2a is an exploded perspective view of a second embodiment of the containing case according to the present invention.
Figure 2B:
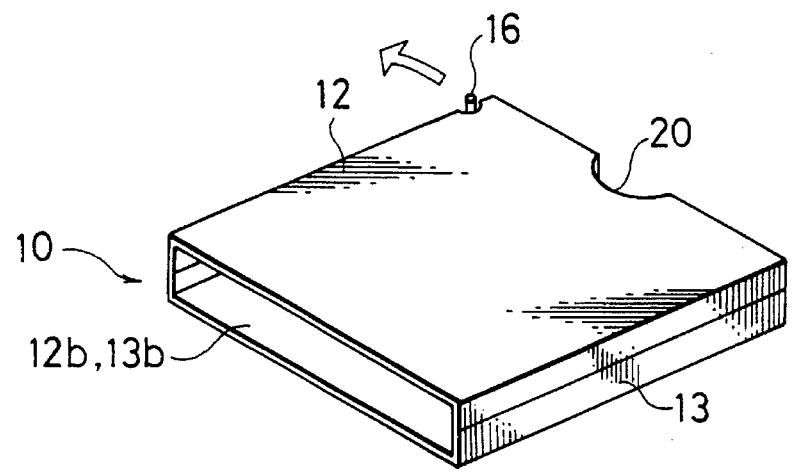

In FIG. 2a and FIG. 2b, the element identical with the element of the first embodiment (FIGS. 1a to 1c) is numbered by the same reference numeral as the first embodiment.

The upper case 12 is formed with a notch 20 at a central portion of a rear edge thereof. The lower case 13 is formed with a notch 21 at a central portion of a rear edge thereof. So that, the cartridge 11 contained in the containing case 10 can be pressed out of the containing case 10 by means of a finger when the cartridge 11 is taken out of the containing case 10. Incidentally, when pressing the containing case 10 by means of the finger, the knob 16 must be bent outwardly thereby to be disengaged with the notch 17.

The second embodiment has an advantages of realizing an improvement of a taken out operation of the cartridge 11 in addition to the advantage of the first embodiment.

A construction of a third embodiment of the containing case according to the present invention will be explained in detail by referring to FIG. 3.

Figure 3:
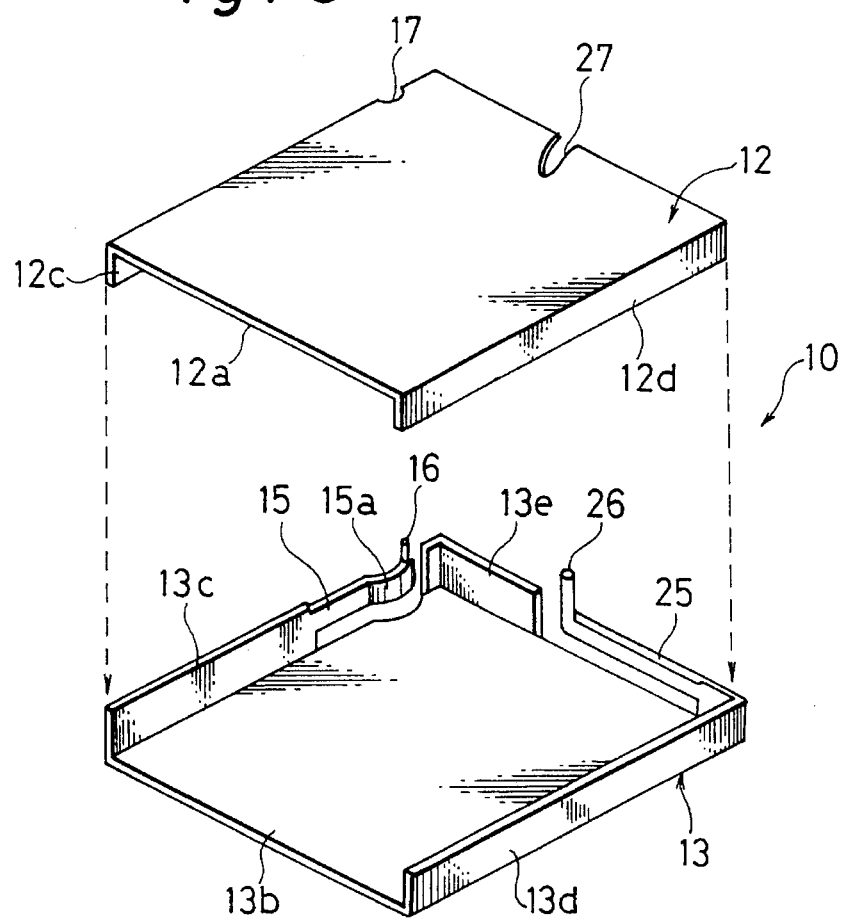
FIG. 3 is an exploded perspective view of a third embodiment of the containing case according to the present invention.

In FIG. 3, the element identical with the element of the first embodiment (FIG. 1a to FIG. 1c) is numbered by the same reference numeral is the first embodiment.

The lower case piece 13 is formed with a press piece 25 by notching one portion of the rear side plate 13e thereof. The press piece 25 is formed unitedly with a knob 26 protruding upwardly. The upper case piece 12 is formed unitedly with a knob guide 27 by notching an rear end portion thereof. The nob guide 27 defines a movement path region of the knob 28. The press piece 25 usually extends in parallel with the rear side plate 13e so as to be on the same plain as the rear side plate 13e. When the press piece 25 is deformed inwardly by operating the knob 28 by the finger, the pressing piece 25 presses one end face of the cartridge 11 contained in the containing case 10, so that the cartridge 11 can be easily pressed out of the containing case 10 through the openings 12b, 13b. Incidentally, when taking out the cartridge 11 from the containing case 10, the knob 16 must be bent outwardly thereby to be disengaged with the notch 17. The knob 28 protrudes upwardly to above an upper face of the upper case piece 12, so an operation of the knob 26 is easily done by the finger. The embodiment has an advantage of realizing an improvement of a pressing out operation of the cartridge 11 in addition to the advantage of the first and second embodiments.

Figure 4:
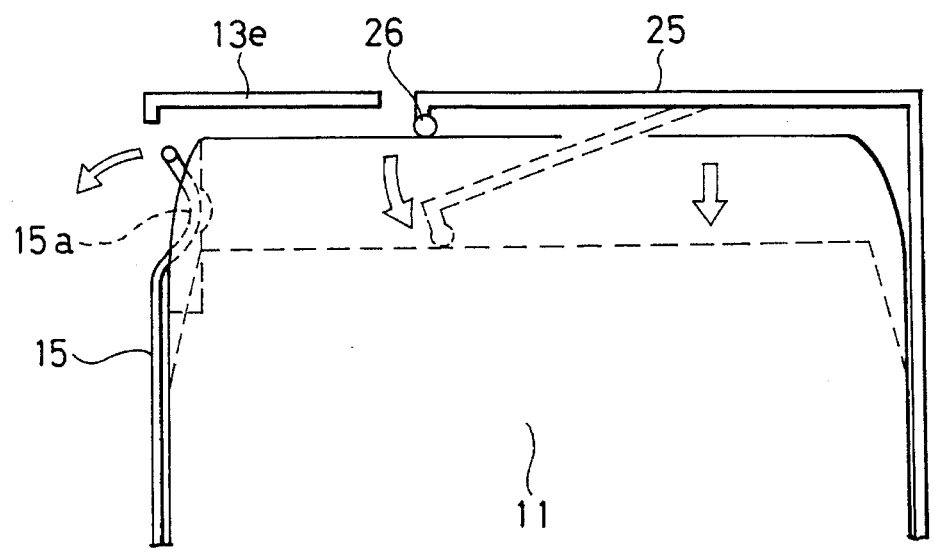
FIG. 4 is an exploded perspective view of a variation of the third embodiment of the containing case according to the present invention.
Figure 5A:
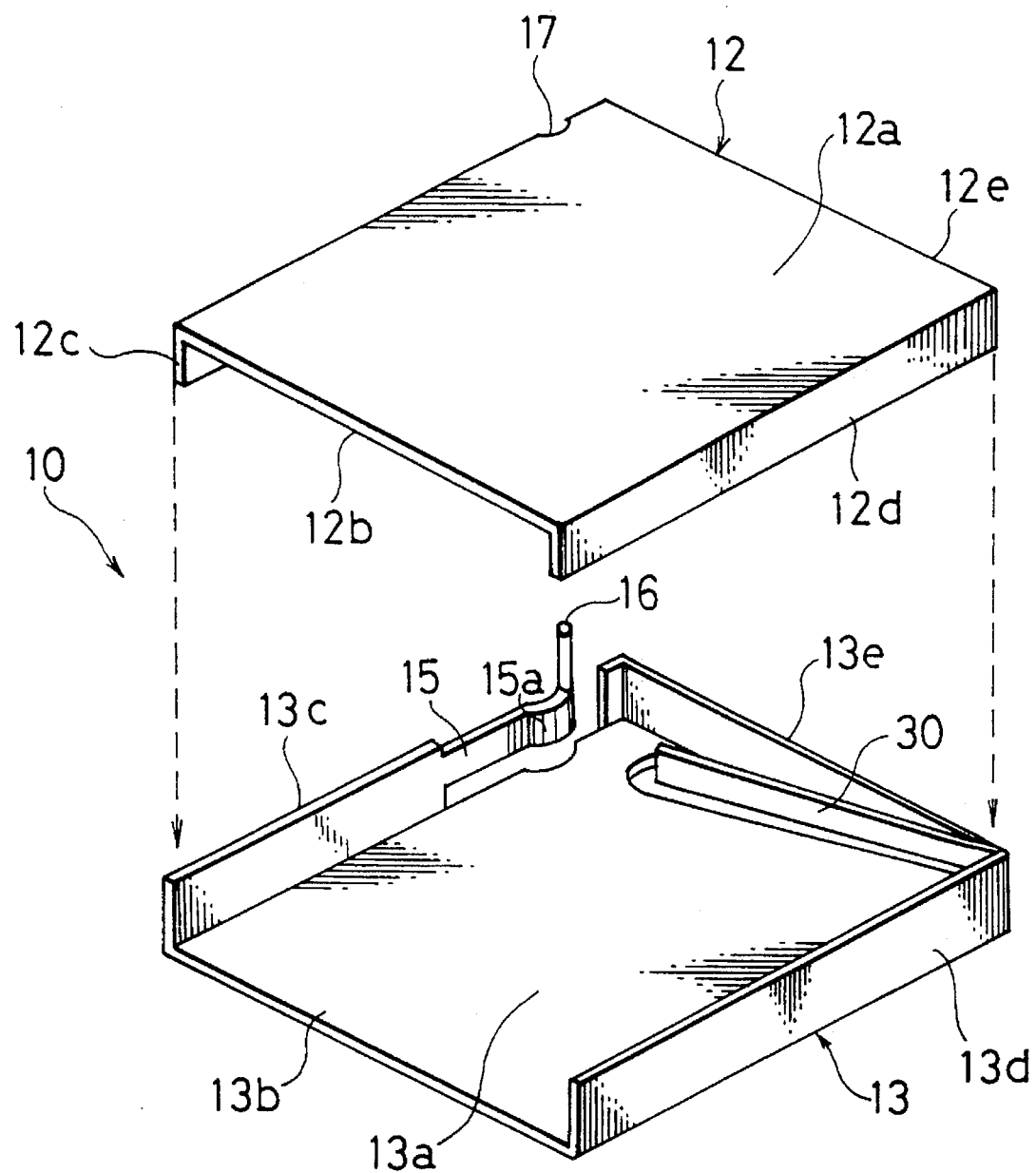
FIG. 5a is an exploded perspective view of a fourth embodiment of the containing case according to the present invention.
Figure 5B:
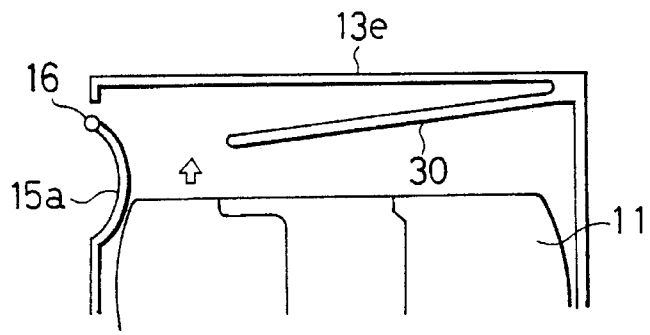
FIGS. 5b to 5e are explanation views for explaining an operation procedure of charging or discharging a cartridge.
Figure 5C:
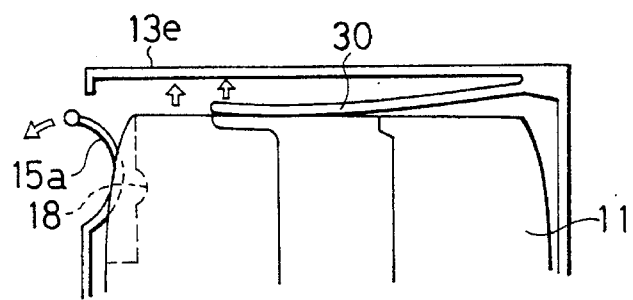
Figure 5D:
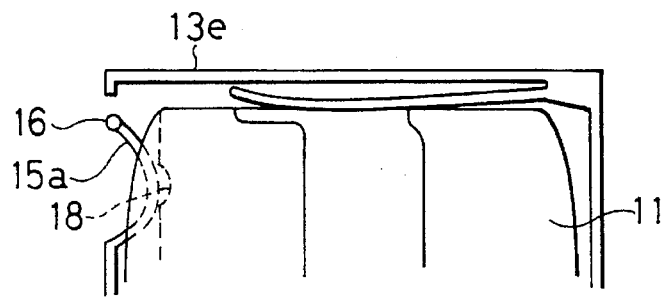
Figure 5E:
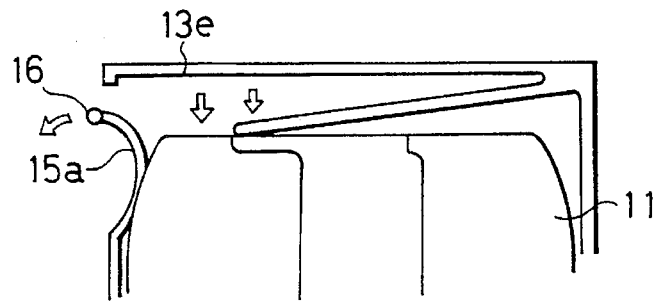

A variation of the third embodiment of the containing case according to the present invention will be explained in detail by referring to FIG. 4.

In this variation, the knob 26 extends inwardly from the press piece 25, and the press piece 25 is previously bent inwardly.

Therefore, the cartridge 11 can be pressed out of the containing case 10 in excellent responsibility on pressing the knob 26 inwardly. If the knob 26 is previously positioned within the containing case 10, the press piece 25 including the knob 26 is urged outwardly by means of the one end face of the inserted cartridge 11.

And then, when the knob 16 is released from the notch 17 and the knob 26 is pressed inwardly, the cartridge 11 can be pressed out of the containing case 10 easily. Incidentally, the knob 26 may be adapted so as not to be pressed by the cartridge 11, when the cartridge 11 is inserted in the containing case 10 thoroughly.

The variation of the third embodiment has an advantage of realizing an improvement of a pressing out operation of the cartridge 11 in addition to the advantage of the first and second embodiments.

A construction of a fourth embodiment of the containing case according to the present invention will be explained in detail by referring to FIGS. 5a to 5e.

In FIGS. 5a to 5e, the element identical with the element of the first embodiment (FIGS. 1a to 1c) is numbered by the same reference numeral as the first embodiment.

A press piece 30 protrudes inwardly and obliquely from one corner portion (or the vicinity of the one corner portion) of the rear side plate 13e of the lower case piece 13. The press piece 30 may be provided on the rear side plate of the upper case piece 14. Accordingly, when the cartridge 11 is finished to engage in the containing case 10, the press piece 30 is pressed to deform due to the front side face of the cartridge 11 thereby to store a resilient force. That is a different point for the other embodiments, The containing case 10 comprises an assembly of the upper case piece 12 and the lower case 13. When the cartridge 11 is inserted into the containing case 10 through the opening 12b, 13b, as shown FIG. 6a and FIG. 6b, the engaging portion 15a of the lever 15 is pressed to deform resiliently and outwardly while the press piece 30 is deformed rearwardly. And further, the cartridge 11 is pressed rearwardly in a condition as shown FIG. 5d, then the engaging portion 15a is fitted in the slot portion 18. Simultaneously, the press piece 30 is compressed in maximum, it stores a great resilient force. Because the engaging portion 15a is fitted in the slot portion 18, the cartridge 11 is held in a containing position thereof. When the lever 15 is bent outwardly in a condition as shown FIG. 5d, the stored resilient force of the press piece 30 is released thereby to urge the cartridge 11 in the front direction, so that one portion of the cartridge 11 can protrude out of the containing case 10 through the openings 12b, 13b.

Figure 6A:
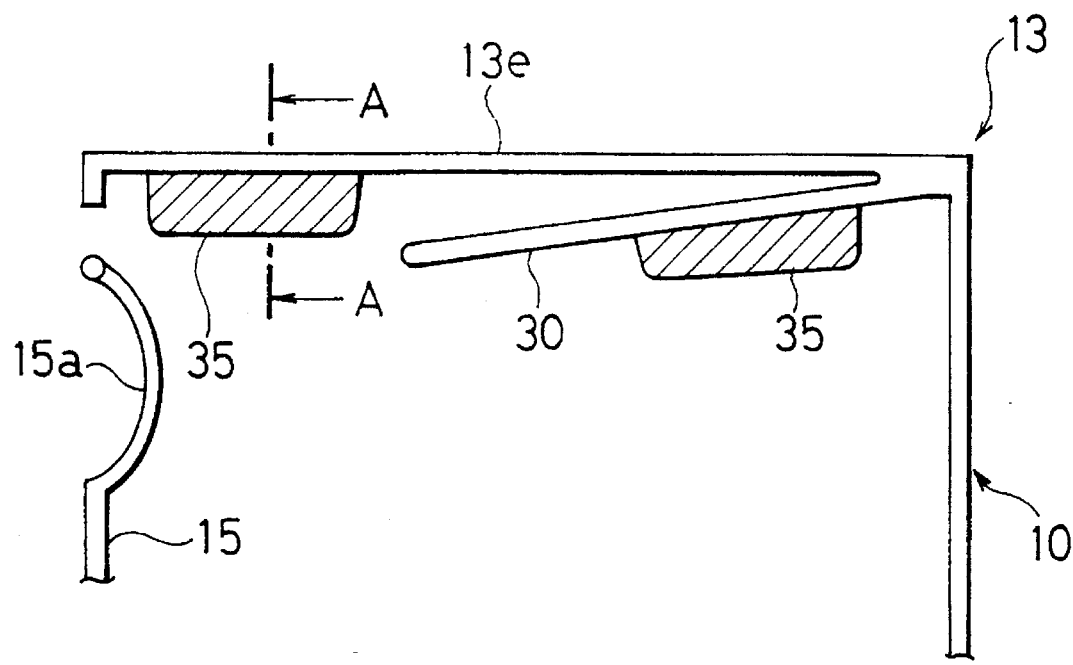
FIG. 6a is a plan view of a main part of a fifth embodiment of the containing case according to the present invention.
Figure 6B:
FIG. 6b is a sectional view of a resilient closing member.
Figure 6C:
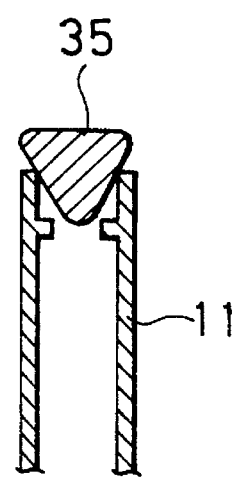
FIG. 6c is a sectional view in which a cartridge is closed by the resilient closing member.
Figure 7:
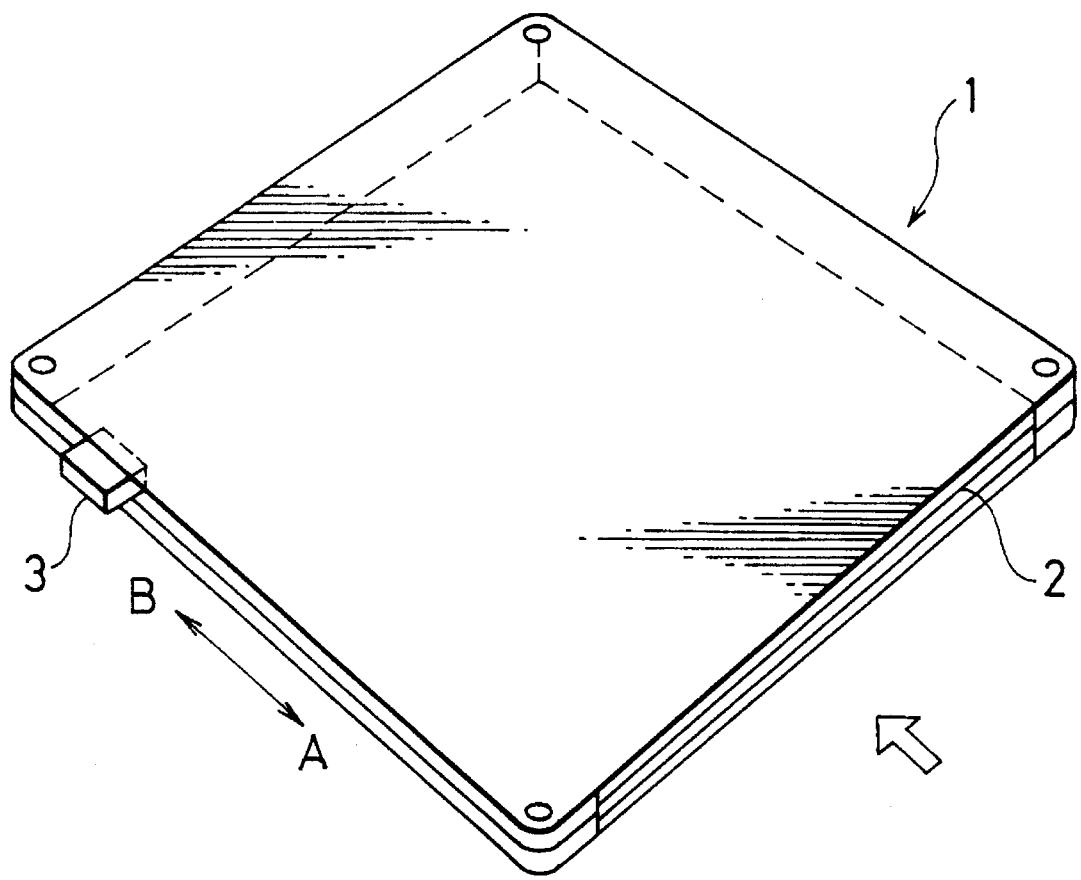
FIG. 7 is a perspective view of a conventional cartridge containing case.

A construction of a fifth embodiment of the containing case according to the present invention will be explained in detail by referring to FIG. 6a to 6c.

A guide groove (opening) of a shutter is disposed at a front end face of the cartridge 11. The guide groove is closed by a resilient closing member 35 made of rubber thereby to prevent an entering of the dusts, and to prevent the shutter from opening in the containing case 10. In this embodiments, the resilient closing member 35 is applied to the containing case 10 of FIG. 5. However, this resilient closing member 35 is applicable to each of the other embodiments. In FIG. 6a, the reason why the resilient closing member 35 is fitted with both of the side plate 13e and the press piece 30 is that the containing case 10 can contain the cartridge 11 even if cartridge 11 is inserted in the containing case 10 the right side out or the rear side out. Each function of the lever 15 and the press piece 30 is the same as the embodiment in FIG. 5.

In a case where the shape of the cartridge 11 to be contained is particularly, and where each position or each shape of the guide groove and the shutter is different, the resilient closing member can be adapted thereto. Therefore, the position or the shape of the resilient closing member 35 as shown in FIG. 6 is merely one example.

The containing case according to the present invention is applicable generally to the containing case for the cartridge containing the disk-like recording medium, and brings various advantages in an operability compared with the conventional book-type containing case.

Many widely different embodiments of the present invention may be constructed without departing from the spirit and scope of the present invention. It should be understood that the present invention is not limited to the specific embodiments described in the specification, except as defined in the appended claims.

What is claimed is:

1. A slide-in-type case for containing a disk cartridge, the disk cartridge being charged and discharged into the case by sliding, said case comprising:

a pair of case pieces each integrally including a base plate, two side walls and a rear wall, said walls being perpendicular to said base plate so as to have a U-shaped transverse cross section, and joined with each other at respective free edges thereof so as to form a case body for containing a disk cartridge, said case body having an opening at a front portion thereof through which a disk cartridge is charged and discharged;

a lever disposed on one side portion of said case body and engageable with a slot respectively formed at a side edge of a disk cartridge charged into said body case through said opening so as to hold the disk cartridge in said case body, said lever integrally including an engaging portion formed by notching said side wall of one of said pair of case pieces and a knob disposed on said engaging portion, said engaging portion being resiliently deformable inward and outward with respect to said case, said knob being operable from the outside of said case body; and a pressing piece integrally formed on one piece of said pair of case pieces so as to inwardly and obliquely protrude from said rear wall of said one piece, for urging a disk cartridge held by said lever when the disk cartridge is charged in said case body, said pressing piece being pressed by a front edge of the disk cartridge thereby to be deformed and store a resilient force.

2. A case according to claim 1, wherein said rear walls of said case pieces are each formed with a notch configured to expose at least a portion of a cartridge contained in said case, and to facilitate ejection of a cartridge when pressed by a finger through said notches.

3. A case according to claim 1, wherein said pressing piece is formed of a cantilevered construction by notching said rear wall in one of said pair of case pieces, said pressing piece having a knob protruding in one body upwardly from a leading end of said pressing piece, and wherein a rear portion of the other of said case pieces is formed with a knob guide which defines a path region for movement of said knob.

4. A case according to claim 1, which further comprises a resilient member positioned on one of said case pieces, the resilient member configured to engage a shutter opening in a disk cartridge so as to close the shutter opening to reduce the amount of dust entering the disk cartridge.

5. A slide-in-type case for containing a disk cartridge, the disk cartridge being charged and discharged into the case by sliding, said case comprising:

a pair of case pieces each integrally including a base plate, two side walls and a rear wall, said walls being perpendicular to said base plate so as to have a U-shaped transverse cross section, and joined with each other at respective free edges thereof so as to form a case body for containing a disk cartridge, said case body having an opening at a front portion thereof through which a disk cartridge is charged and discharged;

a lever disposed on one side portion of said case body and engageable with a slot respectively formed at a side edge of a disk cartridge charged into said body case through said opening so as to hold the disk cartridge in said case body, said lever integrally including an engaging portion formed by notching said side wall of one of said pair of case pieces and a knob disposed on said engaging portion, said engaging portion being resiliently deformable inward and outward with respect to said case, said knob being operable from the outside of said case body; and a pressing piece inwardly protruding from a vicinity of one corner of said rear wall of one piece of said pair of case pieces at a predetermined angle against said rear wall, for urging a disk cartridge held by said lever when the disk cartridge is charged in said case body, said pressing piece being pressed by a front edge of the disk cartridge thereby to be deformed and store a resilient force.

6. A case according to claim 5, which further comprises a resilient member positioned on one of said case pieces, the resilient member configured to engage a shutter opening in a disk cartridge so as to close the shutter opening to reduce the amount of dust entering the disk cartridge.

* * * * *